United States Patent
Karimi et al.

(10) Patent No.: US 11,968,039 B2
(45) Date of Patent: Apr. 23, 2024

(54) SYSTEMS AND METHODS FOR EXECUTING FORWARD ERROR CORRECTION CODING

(71) Applicant: HUAWEI TECHNOLOGIES CO., LTD., Guangdong (CN)

(72) Inventors: Bashirreza Karimi, Ottawa (CA); Masoud Barakatain, Toronto (CA); Yoones Hashemi Toroghi, Ottawa (CA); Alvin Yonathan Sukmadji, North York (CA); Chunpo Pan, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/895,691

(22) Filed: Aug. 25, 2022

(65) Prior Publication Data

US 2023/0072039 A1 Mar. 9, 2023

Related U.S. Application Data

(60) Provisional application No. 63/237,721, filed on Aug. 27, 2021.

(51) Int. Cl.
 *H04L 1/00* (2006.01)
(52) U.S. Cl.
 CPC .......... *H04L 1/0052* (2013.01); *H04L 1/0071* (2013.01)
(58) Field of Classification Search
 CPC .... H04L 1/0052; H04L 1/0071; H04L 1/0057
 See application file for complete search history.

(56) References Cited

U.S. PATENT DOCUMENTS

| | | | | |
|---|---|---|---|---|
| 2004/0008642 | A1* | 1/2004 | Marko | H04L 1/0059 370/347 |
| 2014/0056330 | A1* | 2/2014 | Petrov | H03M 13/15 375/135 |
| 2015/0100859 | A1* | 4/2015 | Petrov | H04L 1/0056 714/776 |
| 2019/0007112 | A1 | 1/2019 | Fax et al. | |
| 2019/0222853 | A1* | 7/2019 | Keinert | H04N 19/463 |
| 2021/0083803 | A1 | 3/2021 | Sheng et al. | |

FOREIGN PATENT DOCUMENTS

| | | |
|---|---|---|
| CN | 104769875 A | 7/2015 |
| CN | 106059974 A | 10/2016 |
| CN | 111224674 A | 6/2020 |
| CN | 111384972 A | 7/2020 |

OTHER PUBLICATIONS

International Search Report issued in co-pending International application No. PCT/CN2022/115483 dated Nov. 25, 2022.

* cited by examiner

*Primary Examiner* — Thien Nguyen
(74) *Attorney, Agent, or Firm* — BCF LLP

(57) ABSTRACT

There is provided methods and processors for executing Forward Error Correction (FEC) coding. The method includes acquiring a stream of real data symbols from a communication medium. The stream of real data symbols being arranged in a real matrix. The method includes generating virtual data symbols being arranged in a virtual matrix. The generating includes applying an interleaver map onto the matrix such that (i) at most c number of virtual data symbols in a given virtual row of the virtual matrix are copies of (ii) real data symbols associated with a same real row of the real matrix, c being a positive integer higher than 1. The method includes decoding codewords formed by the virtual matrix and the matrix.

18 Claims, 8 Drawing Sheets

SYSTEMS AND METHODS FOR EXECUTING FORWARD ERROR CORRECTION CODING

CROSS-REFERENCE TO RELATED APPLICATIONS

This application claims the benefit of U.S. Provisional Patent Application Ser. No. 63/237,721, filed on Aug. 27, 2021. The content of the aforementioned application is incorporated by reference herein.

TECHNICAL FIELD

The present disclosure relates to data encoding and in particular to systems and methods for executing a Forward Error Correction (FEC) coding.

BACKGROUND

High-speed optical transceivers become increasingly commercially available. Forward Error Correction (FEC) are often used in combination with these optical communication systems enabling communication at a high-rate. Broadly speaking, FEC is a method of obtaining error control in data transmission in which the source (transmitter) sends redundant data and the destination (receiver) recognizes the portion of the data that contains no apparent errors. Because FEC does not require handshaking between the source and the destination, it can be used for broadcasting of data to many destinations simultaneously from a single source. Due to complexity constraints at high data throughputs, FEC schemes with hard-decision decoding may be preferred.

In one example, staircase codes are spatially coupled FEC schemes that have been proposed in some solutions. With iterative hard-decision decoding, staircase codes can perform very close to the capacity of the Binary Symmetric Channel (BSC) with low decoding complexity. Staircase codes are not only attractive as a stand-alone FEC solution, but also have received considerable attention in concatenated solutions with multilevel coding (MLC) and bit interleaved coded modulation (BICM) in optical communications. In such schemes, an inner soft-decision code is concatenated with an outer hard-decision outer code. The inner code is tasked with reducing the bit error rate (BER) to a certain level, after which the outer code takes over and corrects the remaining errors down to below $10^{-15}$.

SUMMARY

Spatially-coupled product-like hard-decision FEC schemes such as "staircase" and "zipper" codes have received considerable attention in fiber-optic communications due to their good performance operating close to the BSC channel capacity. For example, staircase codes can be implemented similarly to what is described an article entitled "*Staircase codes: FEC for 100 Gb/s OTN*", authored by B. P. Smith et al., published in the Journal of Lightwave Technology, vol. 30, no. 1, pp. 110-117, 2012, and the contents of which is incorporated herein by reference in its entirety. In another example, zipper codes can be implemented similarly to what is described an article entitled "*Zipper codes: Spatially-coupled product-like codes with iterative algebraic decoding*", authored by Y. Sukmadji, U. Martínez-Peñas, and F. R. Kschischang, published in 16th Canadian Workshop on Information Theory (CWIT), June 2019, pp. 1-6, and the contents of which is incorporated herein by reference in its entirety.

Typically, the best performance of staircase codes and zipper codes is achieved when ultra-low overheads (e.g., 1.5-2.5%) are being utilized. However, the developers of the present technology have realized that at ultra-low overheads the required decoding memory is comparatively large resulting in unacceptable latency.

Zipper Code Framework

With reference to FIG. 5A, there is depicted a graphical representation 500 of a typical zipper code framework. Broadly speaking, a zipper code framework includes three main components: a component code, a zipping pair, and an interleaver map.

For example, the component code can be a Bose-Chaudhuri-Hocquenghem (BCH) code C, of length n, dimension k, and correction capability t. In this example, the zipper buffer is an infinite sequence of BCH codewords $C_0$, $C_1$, $C_2$ ... that form a large matrix with n columns.

In this example, the buffer is divided into two buffers: the virtual buffer A, and the real buffer B. Buffers A and B are called a zipping pair (A, B). It should be noted that only the bits (and/or other symbols) of the real buffer are transmitted over the communication channel. It should also be noted that the virtual bits of the virtual buffer can be determined and used during the decoding process.

The virtual bits of the virtual buffer are a copy of the bits of the real buffer through the interleaver map, denoted by $\varphi$. For practical purposes, the interleaver map can be considered to be bijective, periodic and causal. It can be said that each virtual symbol of a valid zipper codeword must be a copy of a real symbol as prescribed by the interleaver map $\varphi$, and each row of a valid zipper codeword must be a codeword of the corresponding constituent code.

For example, let $m_i=|A_i|$ denote the length of the i-th row of the virtual buffer. The length of the corresponding real row therefore is $n-m_i$. Generally, $m_i$'s for different rows can be different but we must have $m_{i+\vartheta}=m_i$, where $\vartheta>0$ is the interleaver map period.

Developers of the present technology have realized that a "diagonal" interleaver map over constant row sizes (i.e., where $m_i=m$ in all rows) may be used. With reference to FIG. 2A, there is depicted a graphical representation of "diagonal" mapping for a zipper code with m=6. It should be noted that zipper codes with "diagonal" mapping will be referred to herein as "D-zipper" codes.

A zipper code can be decoded using a sliding-window decoding algorithm. Returning to FIG. 5A, there is shown a current decoding window 502 of a given iterative decoding iteration. Broadly speaking, the decoding sliding-window algorithm is configured to iteratively decode M consecutive received rows using an algebraic BCH decoder.

It should be noted that the iterative decoder can be invoked when new rows are acquired. Developers of the present technology have realized that to have a sharp waterfall performance, the ratio M/m should be large in practice. To reduce the decoding complexity, the decoding subroutine can be performed after receiving each µ rows, referred to herein as a "chunk".

It should be noted that decoding each row requires access to previous rows. At the arrival of each chunk, the decoder outputs the oldest chunk within the decoding window. In order to determine the decoder memory size for the window decoder, a new parameter referred to herein as "maximum lookback" parameter $\lambda$ is configured in the zipper code framework. The parameter $\lambda$ defines the maximum number of older rows required in filling the virtual buffer. The value of parameter λ depends on the structure of φ function (i.e., interleaver map).

At the decoder, there exist Mm bits within the window decoder and an additional λm older bits should be kept in memory to perform the decoding. Thus, for the zipper code shown on FIG. 5A, the total decoder memory size is (λ+M)×m.

In other examples, the decoder memory size for staircase and D-zipper codes are (m+M)×m and (m/2+M)×m, respectively. Moreover, to obtain good waterfall performance, the M/m ratio needs to be two times more for staircase code compared to zipper code with the same overhead. With reference to FIG. 3, there is depicted a graphical representation 300 of a relationship between required decoding memory size and the percentage of overhead for the staircase and the D-zipper codes, respectively. Developers of the present technology have realized that the memory and the corresponding latency when executing such FEC schemes is high for ultra-low overheads in the range 1.5-2.5%.

Developers of the present technology have also realized that error floor in various spatially coupled codes is caused by a certain structure referred to herein as a "stall pattern". Broadly speaking, a stall pattern in a zipper framework is a set of error locations in various rows of the real buffer B that cannot be corrected by the BCH component decoder that is configured to correct up to t errors. Developers of the present technology have realized that smaller stall patterns have an important impact on the error floor performance of the zipper codes.

It is an object of the present technology to ameliorate at least some of the inconveniences present in conventional zipper code framework.

In at least some embodiments of the present technology, developers have devised a spatially coupled product-like coding scheme that reduces decoding memory and latency at ultra-low overheads compared to existing solutions, such as the staircase and the D-zipper codes, for example. To that end, developers have devised an interleaver map with a "quasi-diagonal" (QD) design that reduces the decoding memory requirement of the zipper codes with low overhead. As it will be described in greater details herein further below, a zipper code employing such an interleaver map may be referred to as a QD-zipper code.

In some embodiments of the present technology, there is provided a computer-implemented algorithm configured to construct a zipper code structure with a QD interleaver map, in which more than one bit from a single real buffer row is copied to another single virtual buffer row. It is contemplated that a zipper encoder-decoder pair that utilizes the QD interleaver map may achieve reduced encoding and decoding latency.

In other embodiments of the present technology, developers have devised a spatially coupled product-like coding scheme that provides sharp waterfall performance with no sign of error floor down to $10^{-15}$ and can operate within an acceptable gap to the capacity of the BSC channel. To that end, developers of the present technology have devised a FEC coding scheme that allows additional levels of bit protection by introducing an additional interleaver map and an additional virtual buffer. As it will be described in greater details herein further below, such a FEC coding scheme may be referred to as E-zipper code.

In further embodiments of the present technology, there is provided a computer-implemented algorithm configured to construct a zipper code structure comprising more than one virtual buffer, in which bits from the real buffer are copied once in each virtual buffer using respective (and different) interleaver maps. It is contemplated that a zipper encoder-decoder pair that utilizes more than one virtual buffer may achieve sharp waterfall performance.

In additional embodiments, developers of the present technology have devised a FEC coding scheme that allows additional levels of bit protection by introducing an additional interleaver map and an additional virtual buffer, and where the interleaver map and the other interleaver map have QD designs. As it will be described in greater details herein further below, such a FEC coding scheme may be referred to as QDE-zipper code.

In yet additional embodiments of the present technology, there is provided a computer-implemented algorithm configured to construct a zipper code structure with more than one QD interleaver map, and includes more than one corresponding virtual buffer. Such a zipper encoder-decoder pair may achieve reduced latency with sharp waterfall performance.

In additional embodiments of the present technology, developers have devised an FEC scheme suitable for a variety of communication systems with low-overhead and low-latency requirements as both a standalone FEC solution and/or in a concatenated FEC schemes with MLC and/or BICM. In some embodiments, the devised FEC scheme can be used in high performance, long-haul optical links, as well as low power pluggable optical or wireless links.

In a first broad aspect of the present technology, there is provided a method of executing Forward Error Correction (FEC) coding, the method being executable by a processor. The method comprises acquiring a stream of real data symbols from a communication medium, the stream of real data symbols being arranged in a real matrix such that a given real data symbol is associated with a respective real row position and a respective real column position in the real matrix. The method comprises generating virtual data symbols being arranged in a virtual matrix such that a given virtual data symbol is associated with a respective virtual row position and a respective virtual column position in the virtual matrix, the generating including applying an interleaver map onto the matrix such that (i) at most c number of virtual data symbols in a given virtual row of the virtual matrix are copies of (ii) real data symbols associated with a same real row of the real matrix, c being a positive integer higher than 1. The method comprises decoding codewords formed by the virtual matrix and the matrix, a given codeword represented by a given row of virtual data symbols in the virtual matrix and a corresponding row of real data symbols in the matrix.

In some embodiments of the method, the method further comprises generating other virtual data symbols being arranged in an other virtual matrix such that a given other virtual data symbol is associated with a respective other virtual row position and a respective other virtual column position in the other virtual matrix. The generating includes applying an other interleaver map onto the matrix such that (i) at most $c_1$ number of other virtual data symbols in a given other virtual row of the other virtual matrix are copies of (ii) real data symbols associated with the same real row of the real matrix, $c_1$ being a positive integer higher than 1. The interleaver map is different from the other interleaver map such that a given real data symbol in a given real row of the real matrix is copied to a first virtual row in the virtual matrix and to a second virtual row in the other virtual matrix, the first virtual row being different from the second virtual row. The codewords further formed by the other virtual matrix, the given codeword further represented by a given row of other virtual data symbols in the other virtual matrix.

In some embodiments of the method, the real matrix and the virtual matrix represent a real buffer and a virtual buffer of a zipper coding scheme.

In some embodiments of the method, c is equal to 2.

In some embodiments of the method, c is equal to 3.

In some embodiments of the method, c being different from $c_1$.

In some embodiments of the method, the communication medium is an optical communication medium.

In a second broad aspect of the present technology, there is provided a method of executing Forward Error Correction (FEC) coding, the method being executable by a processor. The method comprises acquiring a stream of real data symbols from a communication medium. The stream of real data symbols is arranged in a real matrix such that a given real data symbol is associated with a respective real row position and a respective real column position in the real matrix. The method comprises generating virtual data symbols being arranged in a virtual matrix such that a given virtual data symbol is associated with a respective first virtual row position and a respective first virtual column position in the virtual matrix. The generating includes applying an interleaver map onto the matrix. The method comprises generating other virtual data symbols being arranged in an other virtual matrix such that a given other virtual data symbol is associated with a respective second virtual row position and a respective second virtual column position in the other virtual matrix. The generating includes applying an other interleaver map onto the matrix, the interleaver map being different from the other interleaver map such that (i) the given virtual data symbol and the given other virtual data symbol are copies of the given real data symbol, and the respective first virtual row position is different from the respective second virtual row position. The method comprises decoding the codewords further formed by the other virtual matrix, the virtual matrix and the matrix, the given codeword further represented by a given row of other virtual data symbols in the other virtual matrix, a corresponding row of virtual data symbols in the virtual matrix, and a corresponding row of data symbols in the matrix.

In some embodiments of the method, the communication medium is an optical communication medium.

In a third broad aspect of the present technology, there is provided a processor for executing Forward Error Correction (FEC) coding. The processor is configured to acquire a stream of real data symbols from a communication medium. The stream of real data symbols is arranged in a real matrix such that a given real data symbol is associated with a respective real row position and a respective real column position in the real matrix. The processor is configured to generate virtual data symbols being arranged in a virtual matrix such that a given virtual data symbol is associated with a respective virtual row position and a respective virtual column position in the virtual matrix. The generating includes applying an interleaver map onto the matrix such that (i) at most c number of virtual data symbols in a given virtual row of the virtual matrix are copies of (ii) real data symbols associated with a same real row of the real matrix, c being a positive integer higher than 1. The processor is configured to decode codewords formed by the virtual matrix and the matrix, a given codeword represented by a given row of virtual data symbols in the virtual matrix and a corresponding row of real data symbols in the matrix.

In some embodiments of the processor, the processor is further configured to generate other virtual data symbols being arranged in an other virtual matrix such that a given other virtual data symbol is associated with a respective other virtual row position and a respective other virtual column position in the other virtual matrix. The processor configured to generate includes applying an other interleaver map onto the matrix such that (i) at most $c_1$ number of other virtual data symbols in a given other virtual row of the other virtual matrix are copies of (ii) real data symbols associated with the same real row of the real matrix, $c_1$ being a positive integer higher than 1. The interleaver map is different from the other interleaver map such that a given real data symbol in a given real row of the real matrix is copied to a first virtual row in the virtual matrix and to a second virtual row in the other virtual matrix, the first virtual row being different from the second virtual row. The codewords further formed by the other virtual matrix, the given codeword further represented by a given row of other virtual data symbols in the other virtual matrix.

In some embodiments of the processor, the real matrix and the virtual matrix represent a real buffer and a virtual buffer of a zipper coding scheme.

In some embodiments of the processor, c is equal to 2.

In some embodiments of the processor, c is equal to 3.

In some embodiments of the processor, c being different from $c_1$.

In some embodiments of the processor, the communication medium is an optical communication medium.

In a fourth broad aspect of the present technology, there is provided a processor for executing Forward Error Correction (FEC) coding. The processor is configured to acquire a stream of real data symbols from a communication medium. The stream of real data symbols is arranged in a real matrix such that a given real data symbol is associated with a respective real row position and a respective real column position in the real matrix. The processor is configured to generate virtual data symbols being arranged in a virtual matrix such that a given virtual data symbol is associated with a respective first virtual row position and a respective first virtual column position in the virtual matrix. The processor configured to generate includes applying an interleaver map onto the matrix. The processor is configured to generate other virtual data symbols being arranged in an other virtual matrix such that a given other virtual data symbol is associated with a respective second virtual row position and a respective second virtual column position in the other virtual matrix. The processor configured to generate including applying an other interleaver map onto the matrix, the interleaver map being different from the other interleaver map such that (i) the given virtual data symbol and the given other virtual data symbol are copies of the given real data symbol, and the respective first virtual row position is different from the respective second virtual row position. The processor is configured to decode the codewords further formed by the other virtual matrix, the virtual matrix and the matrix, the given codeword further represented by a given row of other virtual data symbols in the other virtual matrix, a corresponding row of virtual data symbols in the virtual matrix, and a corresponding row of data symbols in the matrix.

In some embodiments of the processor, the communication medium is an optical communication medium.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments of the present disclosure will be described by way of example only with reference to the accompanying drawings, in which.

DETAILED DESCRIPTION

Figure 1:
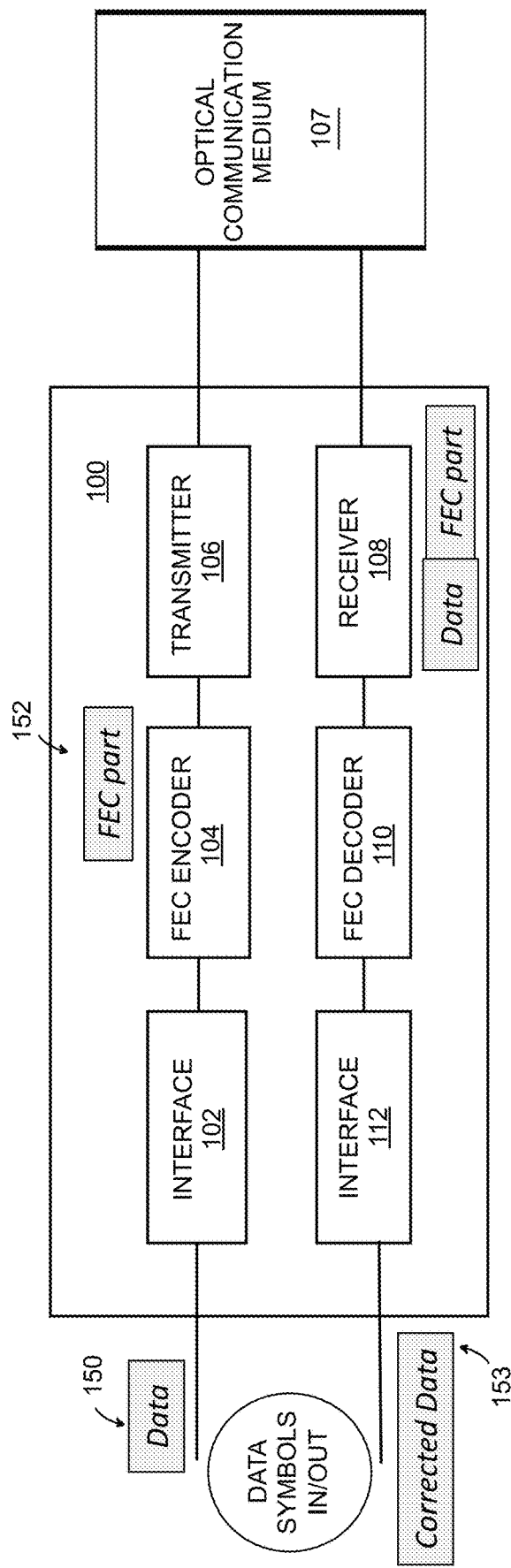
FIG. 1 depicts a system configured to execute a Forward Error Correction (FEC) coding scheme, in accordance with some non-limiting embodiments of the present technology.

FIG. 1 is a block diagram illustrating a system 100 configured to execute a Forward Error Correction (FEC) coding scheme. The system 100 includes an interface 102, a FEC encoder 104, a transmitter 106, a receiver 108, a FEC decoder 110, and an interface 112. However, it should be understood that in some embodiments of the present technology, the system 100 may be implemented with additional, fewer, and/or different components to those illustrated in FIG. 1. For example, the system 100 may be embodied as an optical communication system (e.g., high-speed optical transceiver) enabling communication at a high-rate over an optical communication medium 107.

Broadly speaking, the system 100 is configured to execute the FEC coding scheme for controlling errors in data transmission. In an FEC coding scheme, the source (e.g., transmitter 106) sends redundant data and the destination (e.g., receiver 108) recognizes the portion of the data that contains no apparent errors. In some embodiments, the system 100 may comprise one or more receivers for broadcasting data to many destinations simultaneously from a single source.

The interfaces 102, 112, the transmitter 106, and the receiver 108 represent components that enable the system 100 to transfer a stream of data. The structure and operation of each of these components may depend on inter alia physical media and signaling mechanisms or protocols over which such transfers take place. In general, each component includes at least some sort of physical connection to a transfer medium, possibly in combination with other hardware and/or software-based elements, which will depend on inter alia a specific transfer media and/or specific mechanisms and/or specific implementations of the present technology.

The interfaces 102, 112 enable the system 100 to receive and send, respectively, streams of data symbols such as bits, for example. In some embodiments, the interfaces 102 and 112 could be internal interfaces in a communication device or equipment, for example, that couple the FEC encoder 104 and the FEC decoder 110 to components that generate and process the data symbols. For example, the stream of data received by the interface 102 may include a data chunk 150, and the stream of data transmitted by the interface 112 may include a corrected data chunk 153.

In addition to enabling transfer of the stream of data including the data chunk 150, the transmitter 106 and the receiver 108 also enable transfer of FEC encoded data. For example, the transmitter 106 may send to the receiver 108, over the optical communication medium 107, the data chunk 150 and the FEC encoded data 152. It is contemplated that the transmitter 106 and the receiver 108 may support optical termination and conversion of signals between electrical and optical domains, to provide for transfer of FEC encoded data over the optical communication medium 107, for instance.

The FEC encoder 104 and the FEC decoder 110 could be implemented in any of various ways, using hardware, firmware, one or more processors executing software stored in computer-readable storage, or some combination thereof. Some examples of devices that may be suitable for implementing the FEC encoder 104 and/or the FEC decoder 110 include, but are not limited to, Application Specific Integrated Circuits (ASICs), Programmable Logic Devices (PLDs), Field Programmable Gate Arrays (FPGAs), and microprocessors for executing software stored on a non-transitory computer-readable medium such as a magnetic or optical disk or a solid state memory device.

Generally, the FEC encoder 104 maps data symbols, from a stream of data symbols received by the interface 102 from a streaming source for instance, to data symbol positions in a "matrix" representation. The FEC encoder 104 is configured to operate in accordance with one or more specific zipper code schemes devised by the developers of the present technology to generate the FEC encoded data 152. The FEC encoded data 152 may then be transmitted over a communication medium by the transmitter 106. Generally, FEC decoding is performed by the FEC decoder 110. the FEC decoder 110 is configured to operate in accordance with one or more specific zipper code schemes devised by the developers of the present technology to decode the received FEC encoded data 152.

As it will be described in greater detail herein further below, developers of the present technology have devised the non-limiting embodiments of the zipper code schemes to overcome at least some disadvantages of typical zipper code schemes.

However, it should be noted that operation of the FEC encoder 104 and/or the FEC decoder 110 could be adjusted depending on expected or actual operating conditions. For example, where a particular application does not require maximum coding gain, a higher latency coding can be used to improve other coding parameters, such as burst error correction capability and/or error floor.

Quasi-Diagonal (QD) Interleaver Map

Developers of the present technology have realized at least some disadvantages of typical D-zipper codes. D-zipper codes are zipper codes which comprise a "diagonal" interleaver map between a virtual buffer and a real buffer. Although D-zipper codes can decrease the required decoding memory size compared to staircase codes, the latency of D-zipper codes at ultra-low overheads may be unacceptable for practical optical communication systems. The diagonal interleaver map affects code performance and memory requirement.

Figures 2A, 2B:
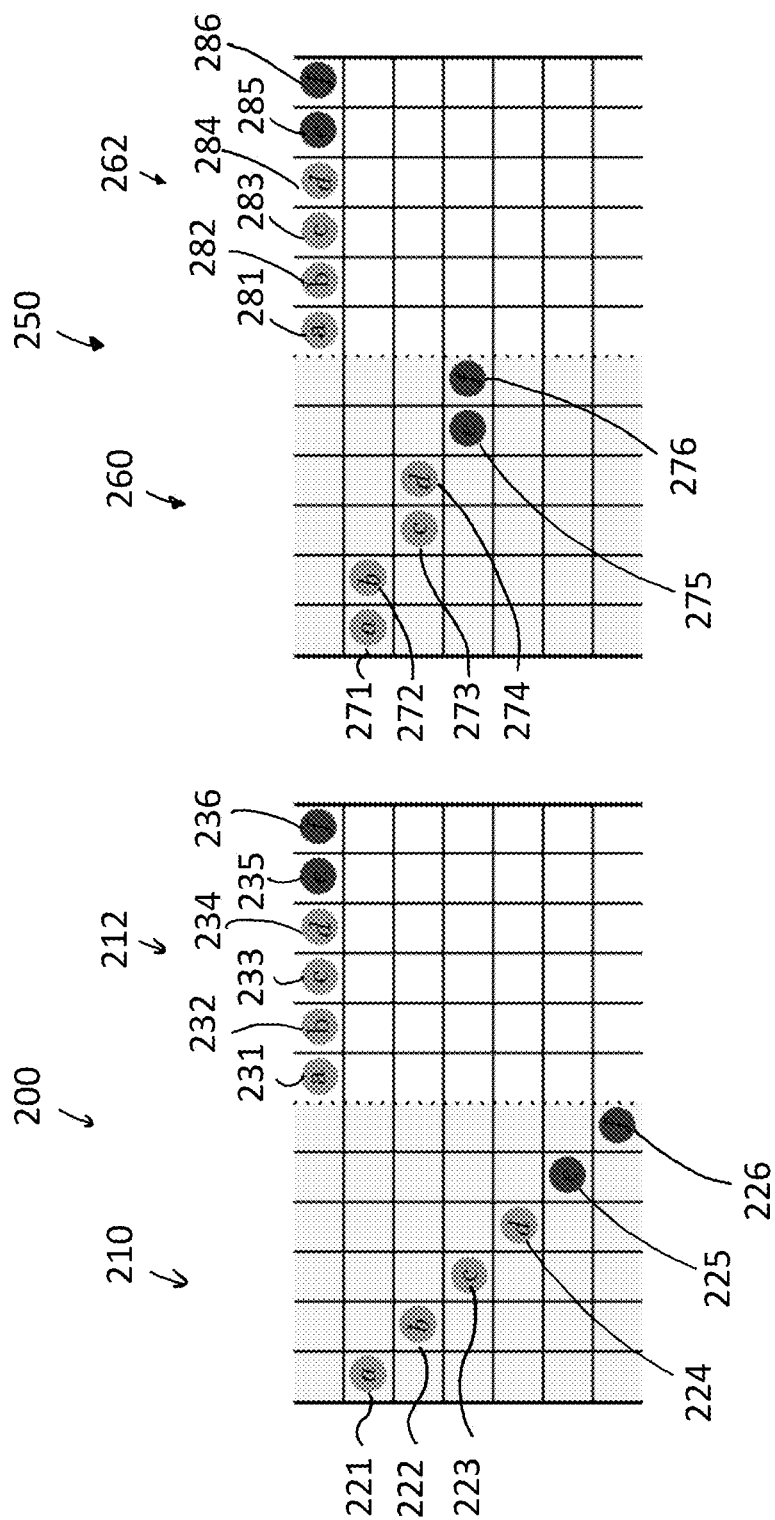
FIG. 2A depicts a simplified representation of operation of an interleaver map of a typical D-zipper code with m equal to 6.
FIG. 2B depicts a simplified representation of an interleaver map of a QD-zipper code with m equal to 6 and c equal to 2, in accordance with some non-limiting embodiments of the present technology.
Figure 3:
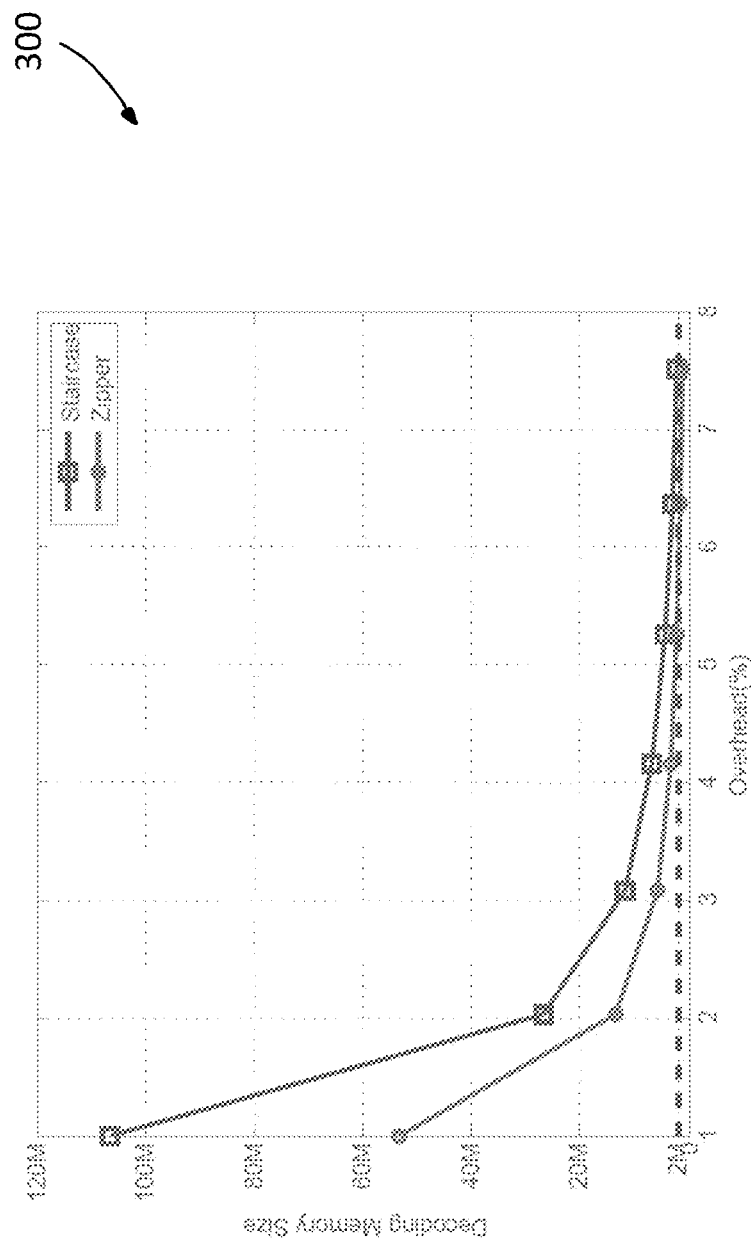
FIG. 3 depicts a graphical representation of a relationship between decoding memory size and percentage of overhead for (i) a staircase code and (ii) a d-zipper code.

With reference to FIG. 2A, there is depicted a simplified representation 200 of operation of an interleaver map of a typical D-zipper code with m equal to 6. The simplified representation 200 shows a portion 210 of a virtual buffer and a portion 212 of a real buffer. It should be noted that only some bits are depicted in the portions 210 and 212 for the sake of simplicity only.

As depicted, a real row from the portion 212 includes real bits 231 to 236. Also, the portion 210 includes virtual bits 221 to 226, which are copies of respective ones amongst the real bits 231 to 236. It should be noted that these copies are positioned "diagonally" in the portion 210 such that they are located in distinct virtual rows of the portion 210 and distinct virtual columns of the portion 210.

It can be said that, in accordance with the D-zipper framework, the virtual bits of a given virtual row are obtained from the real bits of m distinct previous real rows, resulting in a high dependency between the virtual and real rows. It can also be said that, in accordance with the D-zipper framework, the real bits of a given real row are respective copied to the next m distinct virtual rows, resulting in a high dependency between the virtual and real rows.

In at least some non-limiting embodiments of the present technology, developers have developed an interleaver map for comparatively reducing (in comparison to D-zipper code) the dependency between rows of real and virtual buffers with a coupling factor c; which interleaver map is referred to herein as a "Quasi-Diagonal" (QD) interleaver map. Broadly, the QD interleaver map allows up to c virtual bits of a given virtual row to be "copies" of real bits of the same real row, thereby reducing the dependency by a factor of c.

With reference to FIG. 2B, there is depicted a simplified representation 250 of operation of an QD interleaver map of a QD-zipper code with m equal to 6 and a coupling factor c equal to 2, in accordance with at least some non-limiting embodiments of the present technology. The simplified representation 250 shows a portion 260 of a virtual buffer and a portion 262 of the real buffer. It should be noted that only some bits are depicted in the portions 260 and 262 for the sake of simplicity only.

As depicted, a real row from the portion 262 includes real bits 281 to 286. Also, the portion 260 includes virtual bits 271 to 276, which are copies of respective ones amongst the real bits 281 to 286. It should be noted that these copies are positioned "quasi-diagonally" in the portion 260 such that there is more than one virtual bit amongst the virtual bits 271 to 276 in a given virtual row and distinct virtual columns of the portion 260. For example, the virtual bits 271 and 272 are located in a first virtual row, the virtual bits 273 and 274 are located in a second virtual row, and the virtual bits 275 and 276 are located in a third virtual row. It should be noted that a number of virtual bits located in a same virtual row that originate from a same real row depends on a value of the coupling factor c. It can be said that, when the QD interleaver map is employed, plural virtual bits of a given virtual row are obtained from plural real bits of a given real row.

It can also be said that, when the QD interleaver map is employed, the real bits of a given real row are respectively copied into fewer than next m distinct virtual rows. Developers of the present technology have realized that reducing the number of next distinct virtual rows into which real bits from the same real row are copied may have an effect of reducing the memory requirement, since comparatively fewer previous rows will need to be kept in memory during processing if compared to a typical D-zipper code. As can be appreciated when comparing to FIG. 2A, the maximum lookback for the D-zipper code will be $\lambda=6$ while for the QD-zipper code the maximum lookback will be $\lambda=3$. Of note, during processing, memory requirement increases with the value of the maximum lookback parameter $\lambda$.

It should be noted that when QD interleaving is performed, the required encoder memory size is $$\frac{m(m/c+1)}{2}+m$$

bits and the required decoder memory is $$m\left(\frac{m}{2c}+M\right)$$

bits. Developers of the present technology have realized that increasing the coupling factor c considerably reduces the required memory size.

It should be noted that increasing the coupling factor c may affect the waterfall performance and the error-floor performance of QD-zipper codes in some implementations. Developers have realized that an inclusion of the coupling factor c may reduce the size of a smallest "stall pattern" and/or may increase the multiplicity of stall patterns.

Broadly speaking, a stall pattern is a set of error locations in the real buffer that, together with their copies in the virtual buffer, are not correctable by the BCH component decoder. Stall patterns of small size may affect the error floor performance of a zipper code.

Figures 4A, 4B:
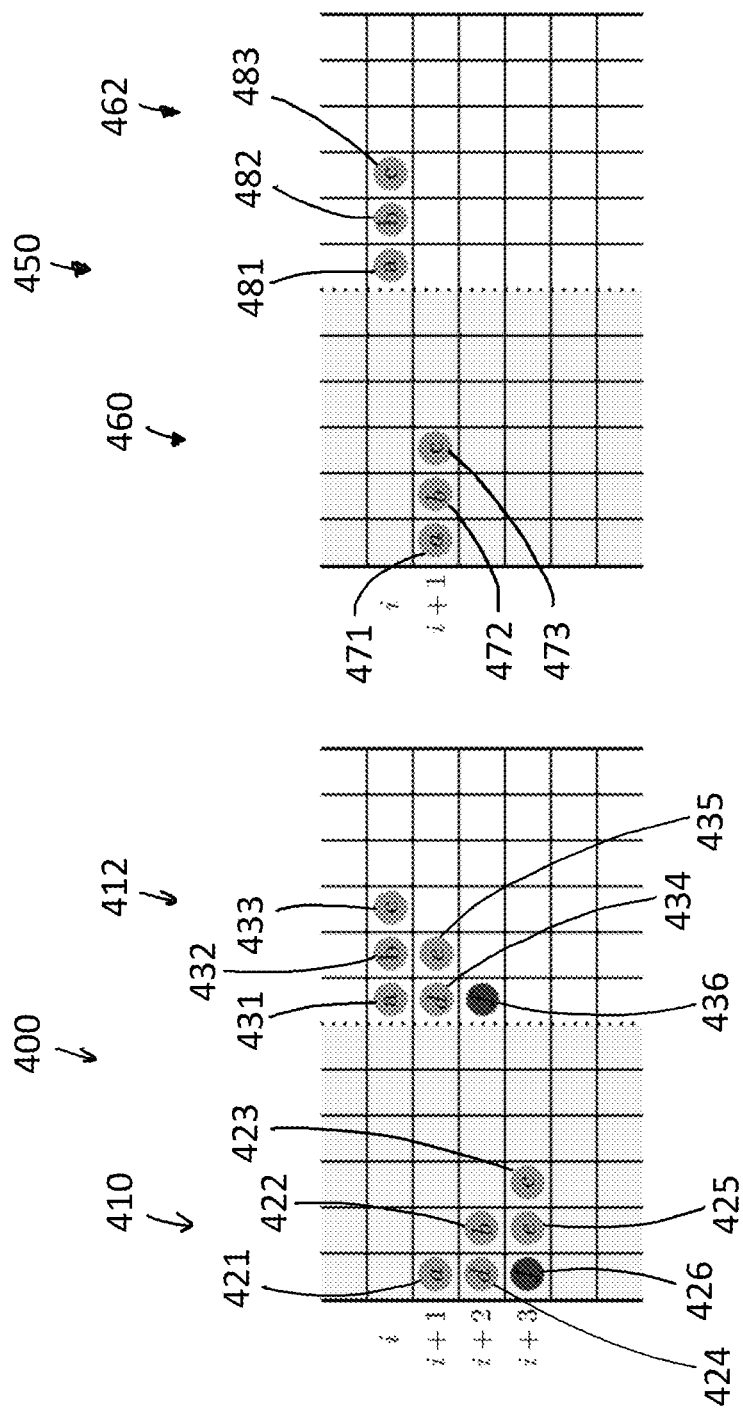
FIG. 4A depicts a simplified representation of a stall pattern of size 6 for a D-zipper code with m equal to 6 and a BCH code with t equal to 2.
FIG. 4B depicts a simplified representation of a stall pattern of size 3 for a QD-zipper code with m equal to 6, c equal to 2, and a BCH code with t equal to 2.

With reference to FIG. 4A there is depicted a simplified representation 460 of a typical D-zipper code with m equal to 6 and a BCH code with t equal to 2. There is a portion 410 of the virtual buffer and a portion 412 of the real buffer. Real bits 431 to 436 are copied to the virtual buffer as corresponding virtual bits 421 to 426. The size of the stall pattern for this typical D-zipper code is equal to 6.

With reference to FIG. 4B there is depicted a simplified representation 450 of a QD-zipper code with m equal to 6, c equal to 3, and a BCH code with t equal to 2. There is a portion 460 of the virtual buffer and a portion 462 of the real buffer. Real bits 481 to 483 are copied to the virtual buffer as corresponding virtual bits 471 to 473. The size of the stall pattern for this QD-zipper code is equal to 3.

For example, when c>t in QD interleaving, the minimum-size stall patterns are of size t+1, compared to $$\frac{(t+1)(t+2)}{2}$$

for the typical D-zipper codes. These stall patterns may affect in the error floor region and are responsible for the degraded error floor performance of QD-zipper codes.

Extra Level of Protection

In the typical D-zipper code of FIG. 4A and in the QD-zipper code of FIG. 4B, each bit is protected by two component codes. When a stall pattern is formed, errors cannot be resolved by the component codes that protect the bits in error. Developers of the present technology have realized that adding protections in the form of additional component codes can potentially resolve at least some stall pattern errors.

Broadly speaking, zipper codes having additional protection layers in the form of additional component codes and respective distinct interleaver maps may be referred to as E-zipper codes. E-zipper codes using QD interleaver maps may be referred to as QDE-zipper codes. However, it is contemplated that E-zipper codes may be employed with other interleaver maps, such as D interleaver maps without departing from the scope of the present technology.

The extra level of protection in a E-zipper code scheme can be implemented by, for example, considering the zipping triplet ($A_1$, $A_2$, B) with two virtual buffers, $A_1$ and $A_2$, and their corresponding (and possibly different) interleaver maps denoted by ($\varphi_1$, $\varphi_2$), respectively.

The extra level of protection in a QDE-zipper code scheme can be implemented by, for example, considering the zipping triplet ($A_1$, $A_2$, B) with two virtual buffers, $A_1$ and $A_2$, and their corresponding (and possibly different) QD interleaver maps denoted by ($\varphi_1$, $\varphi_2$) with coupling factors ($c_1$, $c_2$), respectively.

In order to increase the size of minimum stall patterns in E-zipper codes and QDE-zipper codes, the interleaver maps ($\varphi_1$, $\varphi_2$) are designed such that each bit in the real buffer is mapped to different rows of the two virtual buffers.

Figures 5A, 5B:
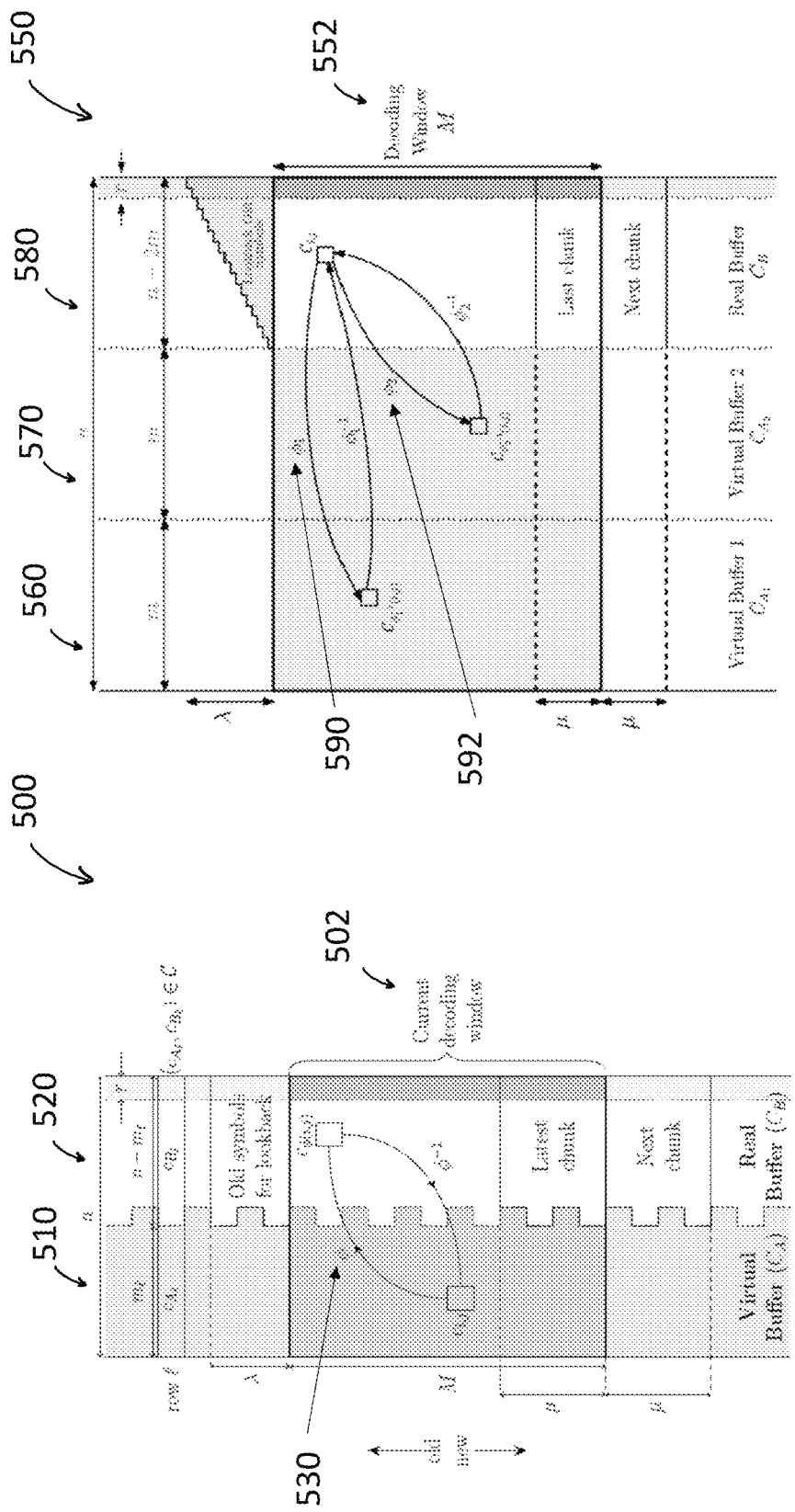
FIG. 5A depicts a graphical representation of a typical zipper code framework with two levels of protection.
FIG. 5B depicts a graphical representation of a structure of a E-zipper code with three levels of protection, in accordance with some non-limiting embodiments of the present technology.

With reference to FIG. 5A, there is depicted a graphical representation 500 of a typical zipper code framework with 2 levels of protection. A current decoding window 502 is applied onto a virtual buffer 510 and a real buffer 520. An interleaving map 530 and its inverse representation is used for encoding and decoding data.

FIG. 5B depicts a graphical representation of a structure of an E-zipper code with 3 levels of protection, in accordance with some non-limiting embodiments of the present technology. A current decoding window 552 is applied onto a first virtual buffer 560, a second virtual buffer 570 and a real buffer 580. A first interleaving map 590 and its inverse representation is used for encoding and decoding data between the first virtual buffer 560 and the real buffer 580. A second interleaving map 592 and its inverse representation are used for encoding and decoding data between the second virtual buffer 570 and the real buffer 580. In some non-limiting embodiments, it is contemplated that a BCH component code with a larger Galois Field (GF) size may be used due to the extra level of protection in E-zipper codes and/or QDE-zipper codes.

Developers of the present technology have realized that the size of the smallest stall pattern is related to the number of affected rows by that pattern. In a conventional zipper code with a diagonal interleaver (see FIG. 4A), if there exists t+1 errors in i-th row of the real buffer, these errors are distributed in t+1 distinct rows of the virtual buffer. As a result, the decoder will be in a sense "trapped" in a stall pattern if all t+2 rows (including the i-th row) have at least t+1 errors. The size of the smallest stall pattern is therefore (t+1)(t+2)/2, which is proportional to the number of affected rows, t+2.

In some embodiments of the QDE-zipper code with c>t, the number of affected rows is at least t+3 because of at least two virtual buffers with different interleaver maps being used. Therefore, the size of the minimal stall pattern for the QDE-zipper code scheme is lower bounded by (t+1)(t+3)/3. For example, when a double-error-correcting BCH component code is used, the smallest stall pattern size for the QDE-zipper code is larger than or equal to 5.

Figure 6:
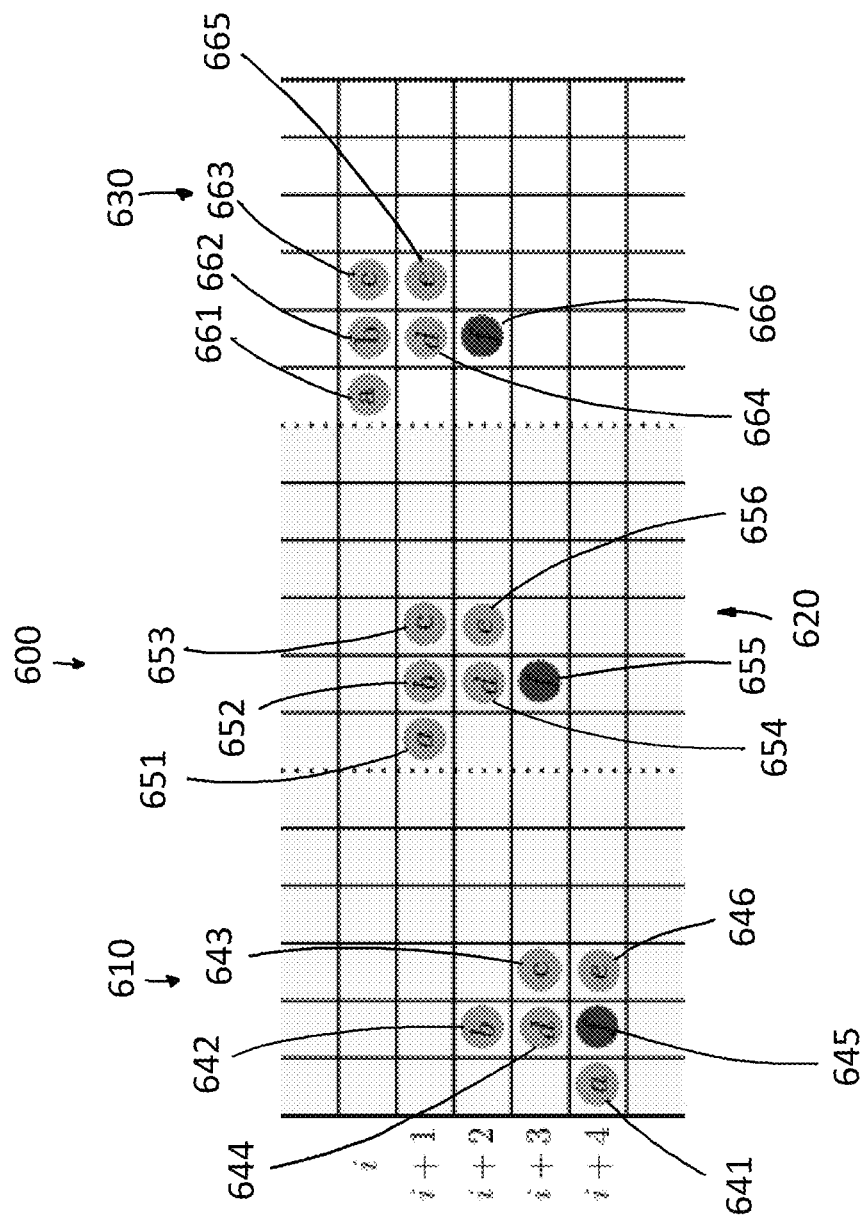
FIG. 6 depicts an example of a stall pattern for a QDE-zipper code with m equal to 6, c equal to 3, three levels of protection, and a BCH component code with t equal to 2.

With reference to FIG. 6, there is depicted an example of a stall pattern for a QDE-zipper code with m equal to 6, c equal to 3, three levels of protection, and a BCF component code with t equal to 2. There is a portion 610 of a first virtual buffer, a portion 620 of a second virtual buffer, and a portion 630 of a real buffer. Real bits 661 to 666 are copied to the first virtual buffer as corresponding first virtual bits 644 to 646 using a first QD interleaving map associated with the first virtual buffer.

The size of the stall pattern for the QDE-zipper code of FIG. 6 is equal to 6. Recalling that the typical D-zipper code of FIG. 4A has a stall pattern size of 6 as well, it is contemplated that waterfall and floor error performances of QDE-zipper codes may be similar to waterfall and floor error performances of D-zipper scores.

Performance

Figure 7:
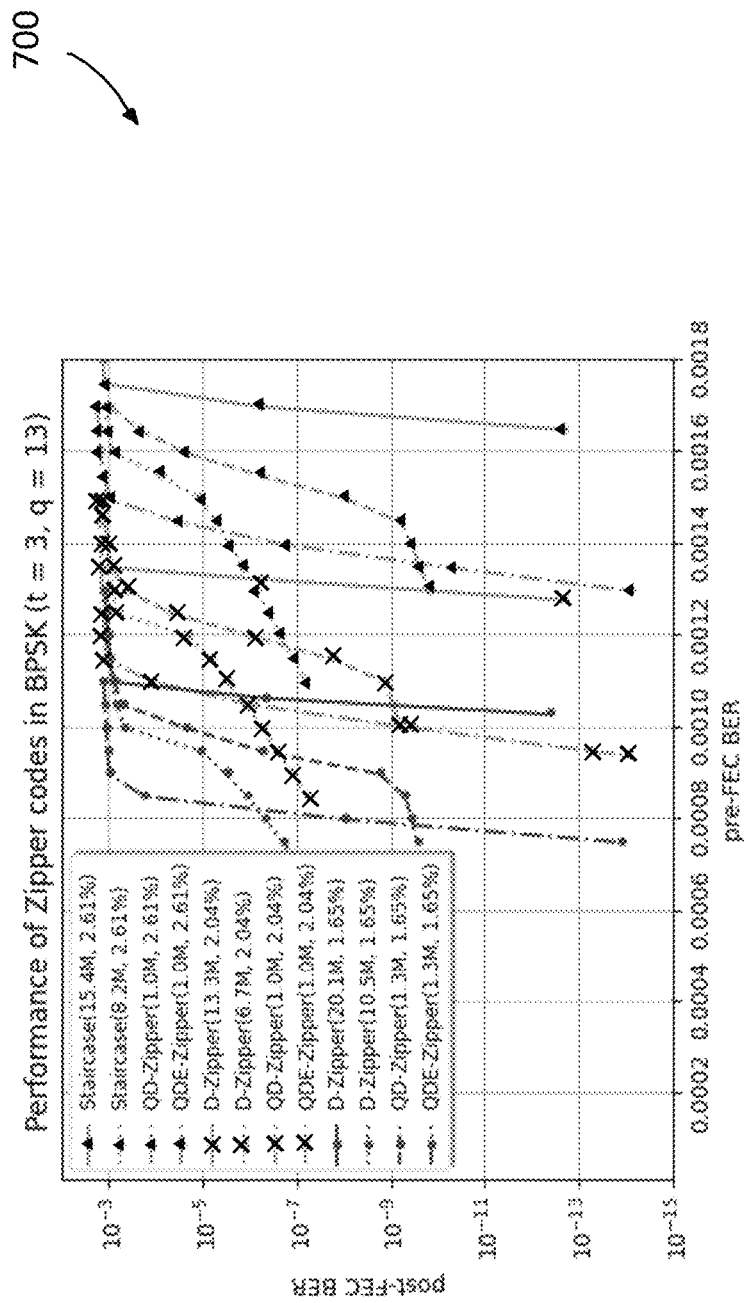
FIG. 7 depicts a graphical representation of performance data for a staircase code, D-zipper code, QD-zipper code, and a QDE-zipper code.

With reference to FIG. 7, there is depicted a graphical representation comparing performance of different types of codes including staircase codes and different zipper codes, namely D-zipper code, QD-zipper code with coupling factor c, and QDE-zipper code with coupling factor c. These codes have been implemented with a triple-error-correcting BCH component code generated from a GF of size $2^{13}$. The graphical representation shows waterfall and error floor performance, and the decoder memory size, at three low overheads, namely: at 1.65%, at 2.04%, and at 2.61%. The graphical representation plots post-FEC BER versus the pre-FEC BER for various code designs.

In some embodiments, it is contemplated that using a QD interleaver map without an extra level of protection may reduce the memory size at the cost of worse error floor performance compared to the D-zipper code with comparatively large memory size. Developers of the present technology have realized that the QDE-zipper code may reduce the required decoding memory size by a factor of up to 15 compared to that of D-zipper code, while also keeping the waterfall region of the curve as "sharp" as the D-zipper code, without any sign of error floor down to the $10^{-15}$ BER region.

It should be noted that the QDE-zipper codes all operate within 0.6 dB gap to the BSC channel capacity. It should also be noted that the performance loss of the QDE-zipper codes may be less than 0.06 dB compared to conventional staircase and D-zipper codes with comparatively larger decoding memory.

Figure 8:
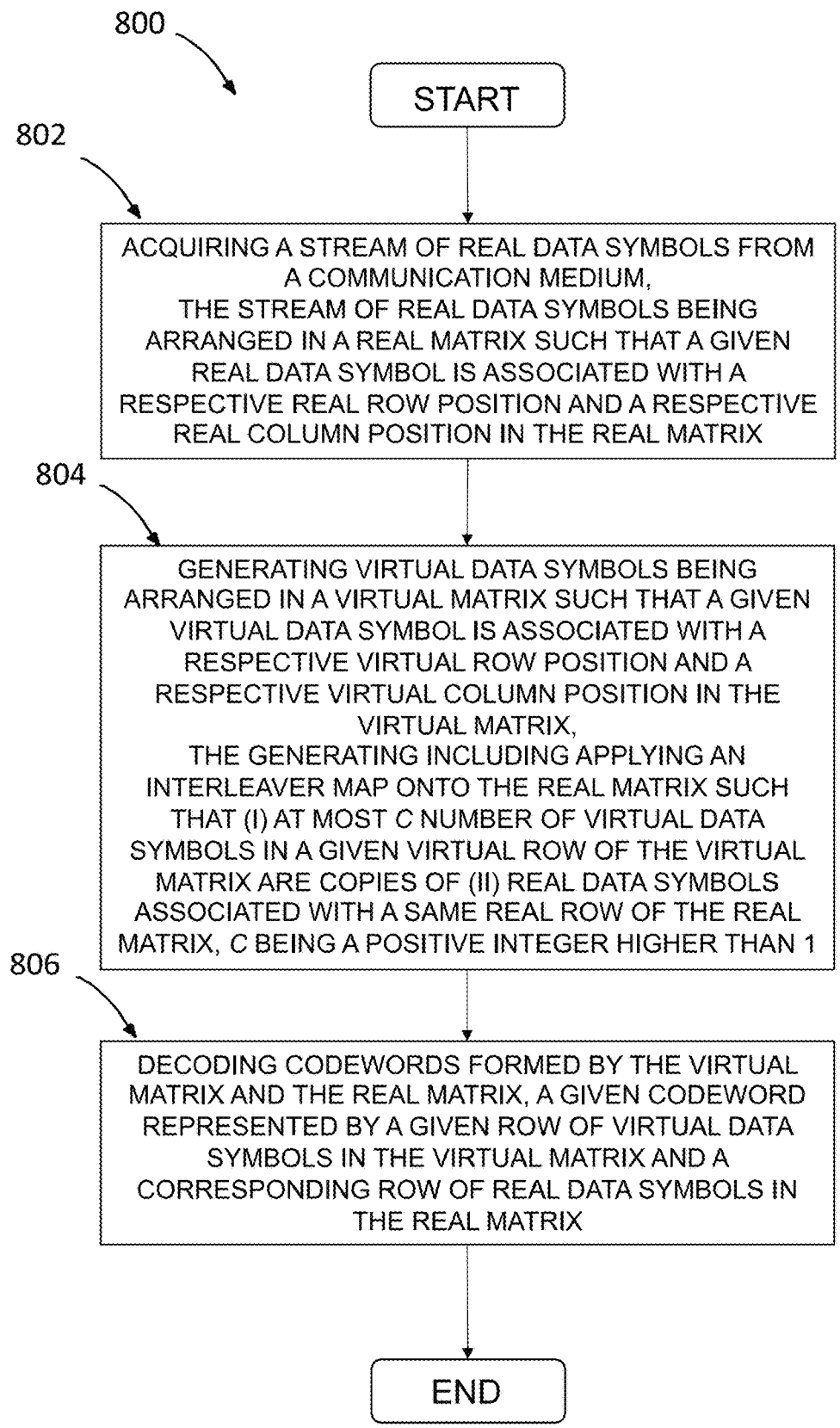
FIG. 8 depicts a scheme-block representation of a method executable by the system of FIG. 1, in accordance with at least some non-limiting embodiments of the present technology.

With reference to FIG. 8, there is depicted a method 800 executable by a processor. In some embodiments of the present technology, it is contemplated that the method 800 may be executed by a component of the system 100 illustrated in FIG. 1, without departing from the scope of the present technology. Various steps of the method 800 will now be described.

STEP 802: Acquiring a Stream of Real Data Symbols

The method 800 begins at step 802 with the processor acquiring a stream of real data symbols from a communication medium. In some embodiments of the present technology, the communication medium may be an optical communication medium implemented similarly to the optical communication medium 107. The stream of real data symbols may be part of FEC encoded data 152 transmitted over the optical communication medium 107.

The stream of real data symbols is arranged in a real matrix such that a given real data symbol is associated with a respective real row position and a respective real column position in the real matrix. It should be noted that the real data symbols from the stream of real data symbols may be included in a real buffer of a given zipper code scheme executed by the system 100. In one non-limiting example illustrated in FIG. 2B, the stream of real data symbols may include the real bits 281 to 286 that are located in a same row of the portion 262 of the real buffer.

STEP 804: Generating Virtual Data Symbols

The method 800 continues to step 804 with the processor configured to generate virtual data symbols being arranged in a virtual matrix such that a given virtual data symbol is associated with a respective virtual row position and a respective virtual column position in the virtual matrix. It should be noted that the virtual data symbols generated by the processor may be included in a virtual buffer of the given zipper code scheme executed by the system 100.

During generation of the virtual data symbols, the processor is configured to apply an interleaver map onto the matrix such that (i) at most c number of virtual data symbols in a given virtual row of the virtual matrix are copies of (ii) real data symbols associated with a same real row of the real matrix. It is contemplated that parameter c is a positive integer higher than 1.

In some embodiments of the present technology, the interleaver map employed by the processor as part of the given zipper code scheme may be a QD interleaver map as described above.

In one non-limiting example illustrated in FIG. 2B, a same real row from the portion 262 includes the real bits 281 to 286. Also, the portion 260 includes virtual bits 271 to 276, which are copies of respective ones amongst the real bits 281 to 286. It should be noted that these copies are positioned "quasi-diagonally" in the portion 260 such that there is more than one virtual bit amongst the virtual bits 271 to 276 in a given virtual row and distinct virtual columns of the portion 260. For example, the virtual bits 271 and 272 are located in a first virtual row, the virtual bits 273 and 274 are located in a second virtual row, and the virtual bits 275 and 276 are located in a third virtual row.

It should be noted that a number of virtual bits located in a same virtual row that originate from a same real row depends on a value of the parameter c. It can be said that, when the QD interleaver map is employed, plural virtual bits of a given virtual row are obtained from plural real bits of a given real row. It can also be said that, when the QD interleaver map is employed, the real bits of a given real row are respectively copied into fewer than next m distinct virtual rows.

In at least some embodiments of the present technology, the processor may be configured to generate more than one virtual buffers for a given real buffer. In these embodiments, the processor may generate other virtual data symbols being arranged in an other virtual matrix such that a given other virtual data symbol is associated with a respective other virtual row position and a respective other virtual column position in the other virtual matrix. It should be noted that the other virtual data symbols from the other virtual matrix may be included in a second virtual buffer of the given zipper code scheme executed by the system 100.

During the generation of the other virtual data symbols, the processor may apply an other interleaver map onto the real matrix, similarly to how the processor is configured to apply the interleaver map onto the real matrix for generation the virtual data symbols of the virtual matrix. However, the interleaver map is different from the other interleaver map such that a given real data symbol in a given real row of the real matrix is copied to a first virtual row in the virtual matrix and to a second virtual row in the other virtual matrix, where the first virtual row is different from the second virtual row.

STEP 806: Decoding Codewords

The method 800 continues to step 806 with the processor configured to decode codewords formed by the virtual matrix and the matrix. A given codeword is represented by a given row of virtual data symbols in the virtual matrix and a corresponding row of real data symbols in the matrix. It can be said that a given codeword is formed at least partially by virtual bits from the virtual buffer and real bits from the real buffer, and where these virtual and real bits are associated with matching row positions in the virtual buffer and the real buffer.

In those embodiments where more than one virtual buffer is generated, a given codeword may be represented by (i) a given row of other virtual data symbols in the other virtual matrix, (ii) a corresponding row of virtual data symbols in the virtual matrix, and (iii) a corresponding row of real data symbols in the matrix.

Those of ordinary skill in the art will realize that the descriptions of various embodiments are illustrative only and are not intended to be in any way limiting. Other embodiments will readily suggest themselves to such persons with ordinary skill in the art having the benefit of the present disclosure. Furthermore, at least some of the disclosed embodiments may be customized to offer valuable solutions to existing needs and problems related to FEC solutions. In the interest of clarity, not all of the routine features of the implementations of the at least some of the disclosed embodiments are shown and described.

In particular, combinations of features are not limited to those presented in the foregoing description as combinations of elements listed in the appended claims form an integral part of the present disclosure. It will, of course, be appreciated that in the development of any such actual implementation of the at least some of the disclosed embodiments, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of digital error correction having the benefit of the present disclosure.

In accordance with the present disclosure, the components, process operations, and/or data structures described in herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory, or a machine, those operations may be stored as a series of instructions readable by the machine, processor or computer, and may be stored on a non-transitory, tangible medium.

Systems and modules described herein may comprise software, firmware, hardware, or any combination(s) of software, firmware, or hardware suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

The invention claimed is:

1. A method of executing Forward Error Correction (FEC) coding, the method being executable by a processor, the method comprising:
   acquiring a stream of real data symbols from a communication medium,
      the stream of real data symbols being arranged in a real matrix such that a given real data symbol is associated with a respective real row position and a respective real column position in the real matrix;
   generating virtual data symbols being arranged in a virtual matrix such that a given virtual data symbol is associated with a respective virtual row position and a respective virtual column position in the virtual matrix,
      the generating including applying an interleaver map onto the real matrix such that (i) at most c number of virtual data symbols in a given virtual row of the virtual matrix are copies of (ii) real data symbols associated with a same real row of the real matrix, c being a positive integer higher than 1; and
   decoding codewords formed by the virtual matrix and the real matrix, a given codeword represented by a given row of virtual data symbols in the virtual matrix and a corresponding row of real data symbols in the real matrix.

2. The method of claim 1, wherein the method further comprises:
   generating other virtual data symbols being arranged in an other virtual matrix such that a given other virtual data symbol is associated with a respective other virtual row position and a respective other virtual column position in the other virtual matrix,
      the generating including applying an other interleaver map onto the real matrix such that (i) at most $c_1$ number of other virtual data symbols in a given other virtual row of the other virtual matrix are copies of (ii) real data symbols associated with the same real row of the real matrix, $c_1$ being a positive integer higher than 1,
      the interleaver map being different from the other interleaver map such that a given real data symbol in a given real row of the real matrix is copied to a first virtual row in the virtual matrix and to a second virtual row in the other virtual matrix, the first virtual row being different from the second virtual row;
   decoding the codewords further formed by the other virtual matrix, the given codeword further represented by a given row of other virtual data symbols in the other virtual matrix.

3. The method of claim 1, wherein the real matrix and the virtual matrix represent a real buffer and a virtual buffer of a zipper coding scheme.

4. The method of claim 1, wherein c is equal to 2.

5. The method of claim 1, wherein c is equal to 3.

6. The method of claim 2, wherein c being different from $c_1$.

7. The method of claim 1, wherein the communication medium is an optical communication medium.

8. A method of executing Forward Error Correction (FEC) coding, the method being executable by a processor, the method comprising:
   acquiring a stream of real data symbols from a communication medium,
      the stream of real data symbols being arranged in a real matrix such that a given real data symbol is associated with a respective real row position and a respective real column position in the real matrix;
   generating virtual data symbols being arranged in a virtual matrix such that a given virtual data symbol is associated with a respective first virtual row position and a respective first virtual column position in the virtual matrix,
      the generating including applying an interleaver map onto the real matrix;
   generating other virtual data symbols being arranged in an other virtual matrix such that a given other virtual data symbol is associated with a respective second virtual row position and a respective second virtual column position in the other virtual matrix,
      the generating including applying an other interleaver map onto the real matrix, the interleaver map being different from the other interleaver map such that (i) the given virtual data symbol and the given other virtual data symbol are copies of the given real data symbol, and the respective first virtual row position is different from the respective second virtual row position;
   decoding codewords formed by the other virtual matrix, the virtual matrix and the real matrix, a given codeword represented by a given row of other virtual data symbols in the other virtual matrix, a corresponding row of virtual data symbols in the virtual matrix, and a corresponding row of data symbols in the real matrix.

9. The method of claim 8, wherein the communication medium is an optical communication medium.

10. A processor for executing Forward Error Correction (FEC) coding, the processor being configured to:
   acquire a stream of real data symbols from a communication medium,
      the stream of real data symbols being arranged in a real matrix such that a given real data symbol is associated with a respective real row position and a respective real column position in the real matrix;

generate virtual data symbols being arranged in a virtual matrix such that a given virtual data symbol is associated with a respective virtual row position and a respective virtual column position in the virtual matrix,
the generating including applying an interleaver map onto the real matrix such that (i) at most c number of virtual data symbols in a given virtual row of the virtual matrix are copies of (ii) real data symbols associated with a same real row of the real matrix, c being a positive integer higher than 1; and
decode codewords formed by the virtual matrix and the real matrix, a given codeword represented by a given row of virtual data symbols in the virtual matrix and a corresponding row of real data symbols in the real matrix.

11. The processor of claim 10, wherein the processor is further configured to:
generate other virtual data symbols being arranged in an other virtual matrix such that a given other virtual data symbol is associated with a respective other virtual row position and a respective other virtual column position in the other virtual matrix,
to generate includes applying an other interleaver map onto the real matrix such that (i) at most $c_1$ number of other virtual data symbols in a given other virtual row of the other virtual matrix are copies of (ii) real data symbols associated with the same real row of the real matrix, $c_1$ being a positive integer higher than 1,
the interleaver map being different from the other interleaver map such that a given real data symbol in a given real row of the real matrix is copied to a first virtual row in the virtual matrix and to a second virtual row in the other virtual matrix, the first virtual row being different from the second virtual row;
decode the codewords further formed by the other virtual matrix, the given codeword further represented by a given row of other virtual data symbols in the other virtual matrix.

12. The processor of claim 10, wherein the real matrix and the virtual matrix represent a real buffer and a virtual buffer of a zipper coding scheme.

13. The processor of claim 10, wherein c is equal to 2.

14. The processor of claim 10, wherein c is equal to 3.

15. The processor of claim 11, wherein c being different from $c_1$.

16. The processor of claim 10, wherein the communication medium is an optical communication medium.

17. A processor for executing Forward Error Correction (FEC) coding, the processor being configured to:
acquire a stream of real data symbols from a communication medium,
the stream of real data symbols being arranged in a real matrix such that a given real data symbol is associated with a respective real row position and a respective real column position in the real matrix;
generate virtual data symbols being arranged in a virtual matrix such that a given virtual data symbol is associated with a respective first virtual row position and a respective first virtual column position in the virtual matrix,
to generate including applying an interleaver map onto the real matrix;
generate other virtual data symbols being arranged in an other virtual matrix such that a given other virtual data symbol is associated with a respective second virtual row position and a respective second virtual column position in the other virtual matrix,
to generate including applying an other interleaver map onto the real matrix, the interleaver map being different from the other interleaver map such that (i) the given virtual data symbol and the given other virtual data symbol are copies of the given real data symbol, and the respective first virtual row position is different from the respective second virtual row position;
decode codewords formed by the other virtual matrix, the virtual matrix and the real matrix, a given codeword represented by a given row of other virtual data symbols in the other virtual matrix, a corresponding row of virtual data symbols in the virtual matrix, and a corresponding row of data symbols in the real matrix.

18. The processor of claim 17, wherein the communication medium is an optical communication medium.

\* \* \* \* \*